US010756965B2

(12) United States Patent
He et al.

(10) Patent No.: US 10,756,965 B2
(45) Date of Patent: Aug. 25, 2020

(54) SYSTEM AND METHOD FOR MANAGING DEVICES IN A LOCAL NETWORK

(71) Applicant: Verizon Patent and Licensing Inc., Arlington, VA (US)

(72) Inventors: Dayong He, Bridgewater, NJ (US); Ray P. Hwang, Green Brook, NJ (US); Jyotsna Kachroo, Milburn, NJ (US); Hany Samir Atiya, Clifton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/994,806

(22) Filed: May 31, 2018

(65) Prior Publication Data

US 2019/0372836 A1 Dec. 5, 2019

(51) Int. Cl.
*H04L 12/28* (2006.01)
*H04L 12/24* (2006.01)
*H04L 29/08* (2006.01)

(52) U.S. Cl.
CPC ...... *H04L 41/0806* (2013.01); *H04L 12/2803* (2013.01); *H04L 41/0681* (2013.01); *H04L 41/14* (2013.01); *H04L 67/12* (2013.01)

(58) Field of Classification Search
CPC . H04L 41/0806; H04L 41/14; H04L 12/2803; H04L 67/12; H04L 41/0681; H04W 4/70
See application file for complete search history.

(56) References Cited

U.S. PATENT DOCUMENTS

| | | | | |
|---|---|---|---|---|
| 9,693,377 | B2* | 6/2017 | Gulliksson | H04W 76/14 |
| 10,114,939 | B1* | 10/2018 | Bhalerao | G06F 21/44 |
| 2016/0139575 | A1* | 5/2016 | Funes | H04L 12/2834 700/275 |
| 2016/0143028 | A1* | 5/2016 | Mancuso | H04L 63/20 370/338 |
| 2017/0118015 | A1* | 4/2017 | Kwak | G05B 15/02 |
| 2017/0181056 | A1* | 6/2017 | Hemphill | H04L 41/0806 |
| 2018/0284736 | A1* | 10/2018 | Cella | G05B 23/024 |
| 2018/0316518 | A1* | 11/2018 | Farrahi Moghaddam | H02J 3/14 |
| 2019/0140906 | A1* | 5/2019 | Furuichi | H04L 41/12 |

* cited by examiner

*Primary Examiner* — Edan Orgad
*Assistant Examiner* — Malick A Sohrab

(57) ABSTRACT

A management device may identify a client device, of a plurality of client devices, in a local network, and may configure one or more remote connection parameters for a connection between the client device and a remote device, configure one or more local connection parameters for a connection between the client device and another client device, of the plurality of client devices, in the local network, configure one or more monitoring parameters for monitoring the client device, and configure one or more alarm parameters for the client device. The management device may manage the client device based on the one or more remote connection parameters, the one or more local connection parameters, the one or more monitoring parameters, and the one or more alarm parameters.

20 Claims, 10 Drawing Sheets

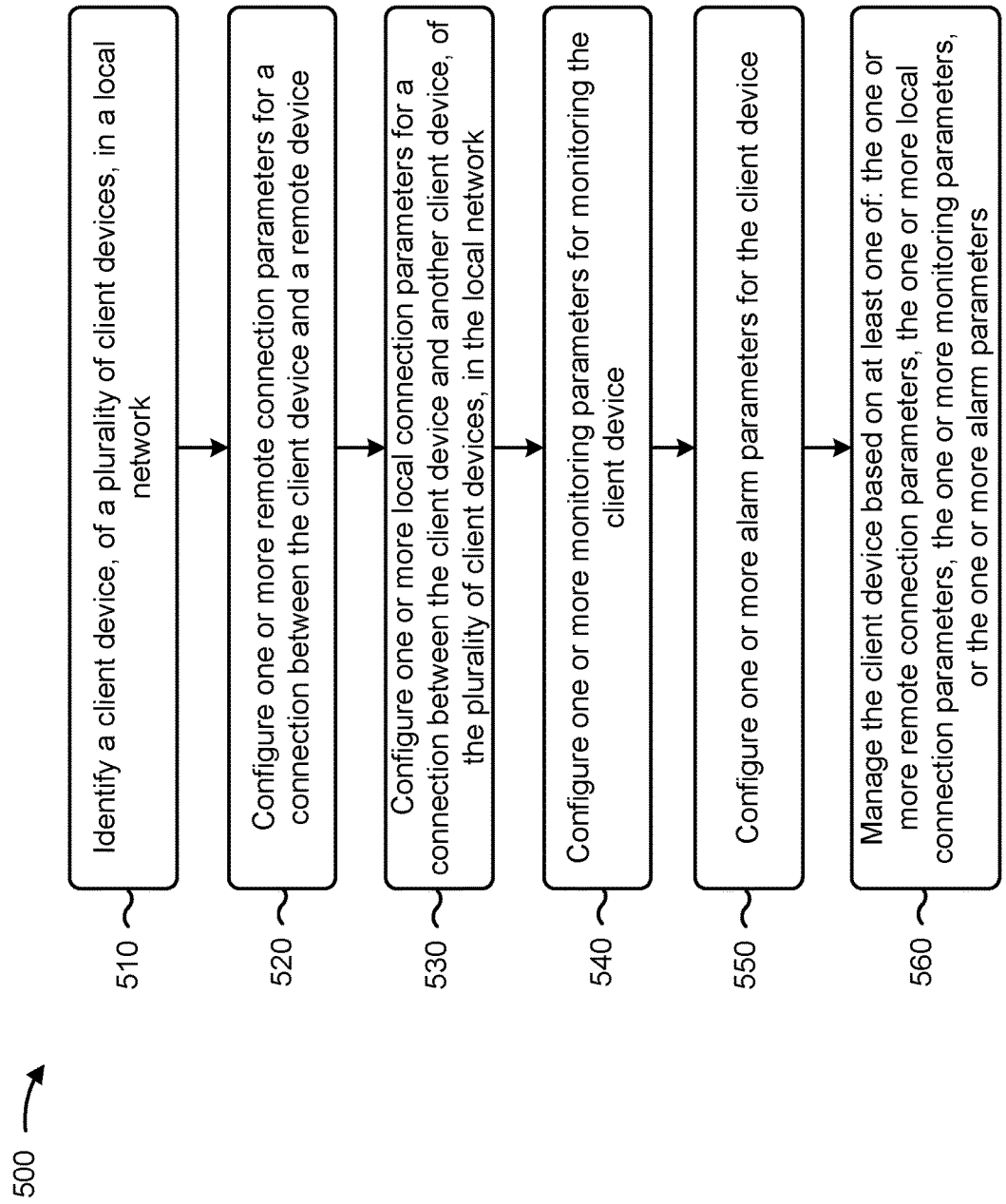

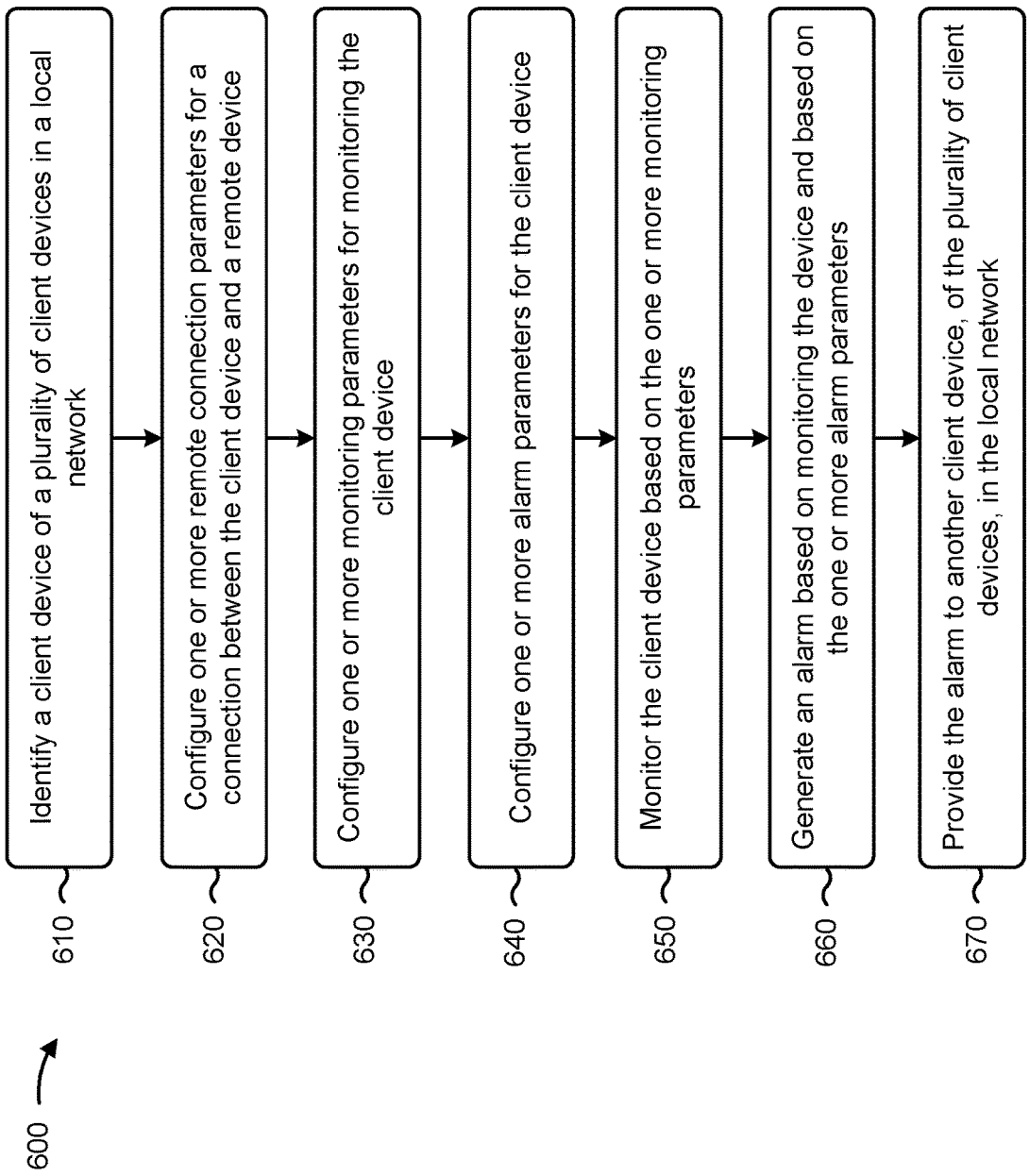

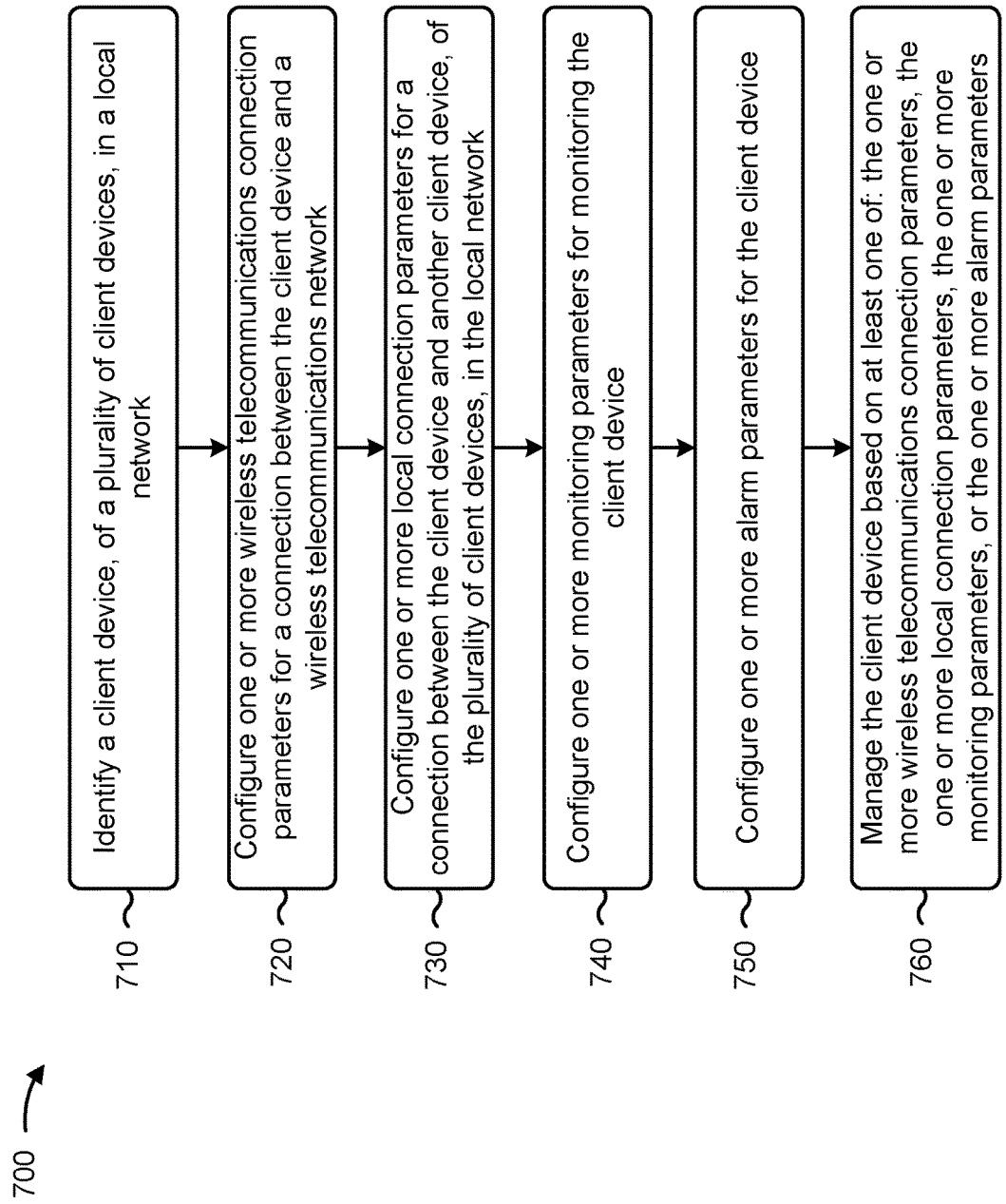

SYSTEM AND METHOD FOR MANAGING DEVICES IN A LOCAL NETWORK

BACKGROUND

The Internet of Things (IoT) may include a network of physical devices, vehicles, home appliances and other items embedded with electronics, software, sensors, actuators, and functionality that enables these items to connect and exchange data without the direct or immediate involvement of a human being. In the context of a home network, IoT devices can include lighting, thermostats, appliances, media and security systems, and/or the like.

BRIEF DESCRIPTION OF THE DRAWINGS

FIG. 5 is a flow chart of an example process for managing devices in a local network.

FIG. 6 is a flow chart of an example process for managing devices in a local network.

FIG. 7 is a flow chart of an example process for managing devices in a local network.

DETAILED DESCRIPTION OF PREFERRED EMBODIMENTS

Figure 1A:
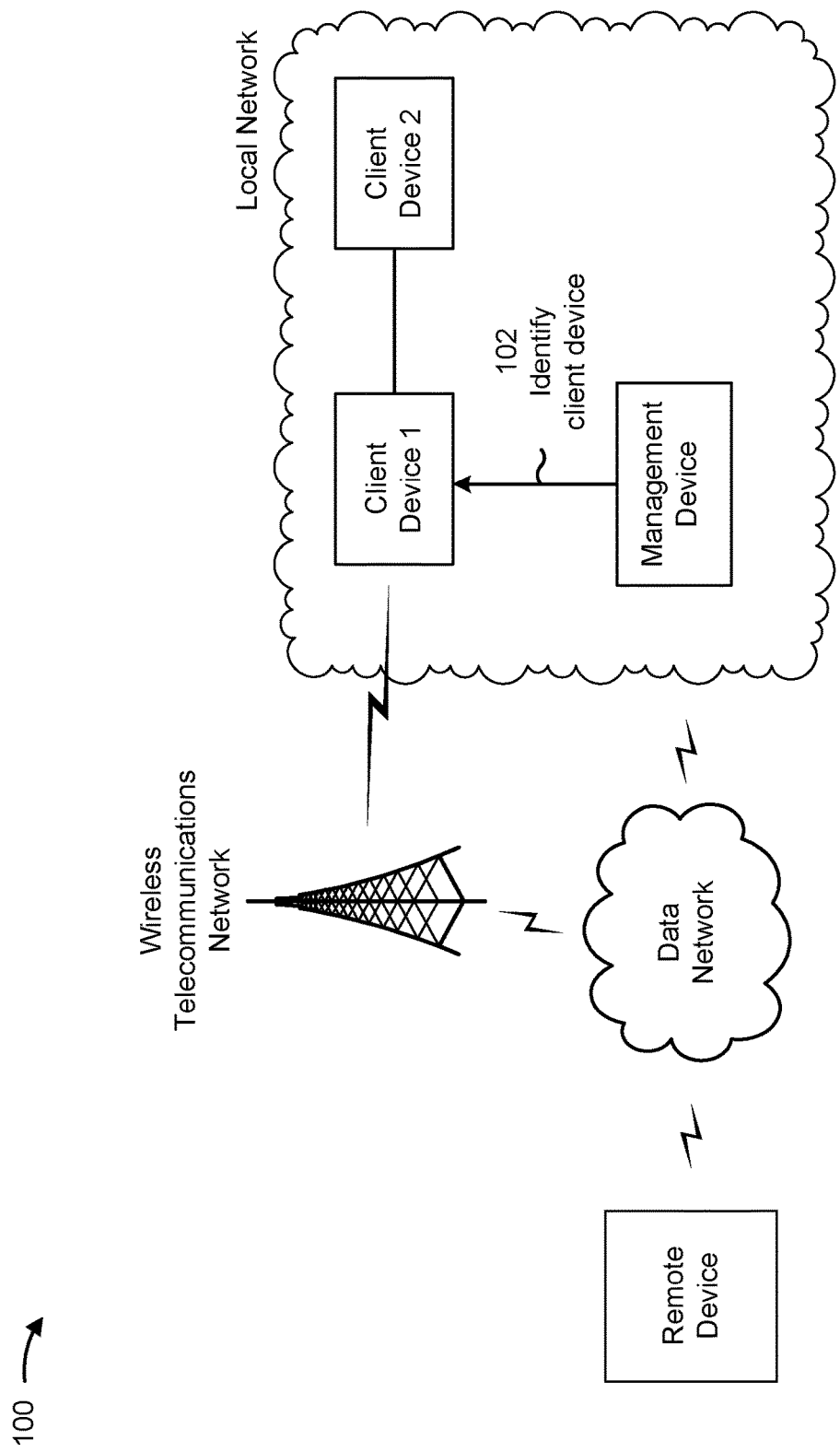
FIGS. 1A-1D are diagrams of an overview of an example implementation described herein.

The following detailed description of example implementations refers to the accompanying drawings. The same reference numbers in different drawings may identify the same or similar elements.

As smart client devices become more popular, the quantity of devices connected to a local network, such as a home network, continues to increase. Client devices such as security devices, smart appliances, wearables, and/or the like each have different types of connections and generate different types of data. They may require different configuration setups, may come from different vendors, may require different types of connection protocols, and may communicate using different types of data. However, there may be a lack of management functionality in the local network to manage the client devices in a centralized way.

Some implementations described herein provide a device capable of securing, managing and monitoring client devices in a local network. The management device may configure one or more parameters for a client device, and may manage the client device based on the one or more parameters. In this way, the management device acts as a centralized point for managing, securing and monitoring the client device in the local network. This allows the management device to strengthen security in the local network by managing connections between client devices in the local network, as well as connections between remote devices external to the local network and the client devices in the local network. Moreover, this results in an increase in the privacy of data associated with, and generated by, the client device, by specifying which devices are permitted to access the data.

FIGS. 1A-1D are diagrams of an example implementation 100 described herein. As shown in FIGS. 1A-1D, implementation 100 may include a remote device, a data network, a wireless telecommunications network, a local network, one or more client devices (e.g., client device 1, client device 2, etc.) a management device, and/or the like.

In some implementations, the remote device may include a device external to the local network. For example, the remote device may include a client device (e.g., a mobile phone, a smart phone, a computer, a wearable communication device, an IoT device, etc.), a server device (e.g., an application server, a data center, a virtual machine server, a cloud server, etc.), and/or the like. In some implementations, the data network may include one or more packet data networks. For example, the network may include a wide area network (WAN) such as the Internet, an Internet service provider (ISP) network, an access network, and/or the like.

In some implementations, the local network may provide client devices (e.g., client device 1, client device 2, and/or the like) with access to the data network and/or the remote device, and may provide the remote device with access to the client devices. In some implementations, the local network may include various types of wired and/or wireless local area networks (LANs), such as a wired LAN, a wireless LAN (WLAN), a home network, an office network, a campus network, and/or the like. In some implementations, the local network may allow devices in the local network (e.g., the management device, client device 1, client device 2, and/or the like) to communicate using various wired and/or wireless communications protocols, such as ETHERNET, WI-FI (i.e., Institute of Electrical and Electronics Engineers (IEEE) 802.11), BLUETOOTH, near-field communications (NFC), ZIGBEE, Z-WAVE, and/or the like.

In some implementations, the client devices (e.g., client device 1 and client device 2, and/or the like) may be included in the local network and may be various types of client devices, such as a mobile device (e.g., a smart phone, a tablet computer, a laptop computer, a handheld computer, and/or the like), a wearable communications device (e.g., a smart wristwatch, a pair of smart eyeglasses, and/or the like), a desktop computer, and Internet of Things (IoT) device (e.g., a smart refrigerator, a smart thermostat, a home management device, a security system, a smart washer or dryer, a garage door opener, and/or the like), a smart entertainment device (e.g., a gaming system, a smart television, a sound bar, a media player, a home audio/video receiver, a smart speaker, and/or the like), and/or the like.

In some implementations, a client device (e.g., client device 1) may connect to another client device (e.g., client device 2) in the local network through a network device (e.g., a router, a gateway, a switch, and/or the like) or in a peer-to-peer (P2P) connection (e.g., Bluetooth, Wi-Fi Direct, NFC, Zigbee, Z-wave, and/or the like). In some implementations, a client device (e.g., client device 1) may connect to the data network using a connection external to the local network. For example, client device 1 may be equipped with a wireless telecommunications interface, and may connect to the data network through the wireless telecommunications network as well as through the network device in the local network.

In some implementations, the management device may be included in the local network and may manage various devices (e.g., client device 1, client device 2, and/or the like) in the local network. In some implementations, the management device may be a network device, such as a firewall, a router, a switch, a gateway, a network bridge, a hub, and/or the like. In some implementations, the management device may be a server device, such as a desktop server, a virtual machine (VM) server, and/or the like. In some implementations, the management device may be a personal computing device, such as a laptop computer, a mobile phone, and/or the like.

In some implementations, the management device may be connected between the client devices in the local network and the network device that connects the local network to the data network. In some implementations, the management device may be connected to the network device, and the network device may redirect traffic to and from the client devices to the management device. In this way, the connection between the client devices in the local network, and the connection between the client devices and the data network, may be managed by the management device.

Turning now to FIG. 1A, as shown by reference number 102, in order to manage client devices in the local network, the management device may identify a client device (e.g., client device 1). For example, the management device may identify client device 1 by scanning the local network for existing client devices. As another example, the management device may identify client device 1 based on detecting client device 1 attempting to connect to the local network, and/or the like.

In some implementations, based on identifying client device 1, the management device may provide a notification to client device 1 indicating that client device 1 may use the management device to manage client device 1. The notification may be a pop-up notification on a display of client device 1, an email, a text message, a web page, and/or the like. The notification may include a description of the functionality of the management device and a request for permission from a user of client device 1 to allow the management device to manage client device 1. In some implementations, the management device may provide the notification to client device 1 based on detecting client device 1 attempting to connect to the local network. For example, the management device may detect that client device 1 attempted to connect to the local network and, based on detecting the attempt, may provide the notification to client device 1. In some implementations, the management device may prevent client device 1 from connecting to the local network if the user of client device 1 does not give permission to the management device to manage client device 1.

Figure 1B:
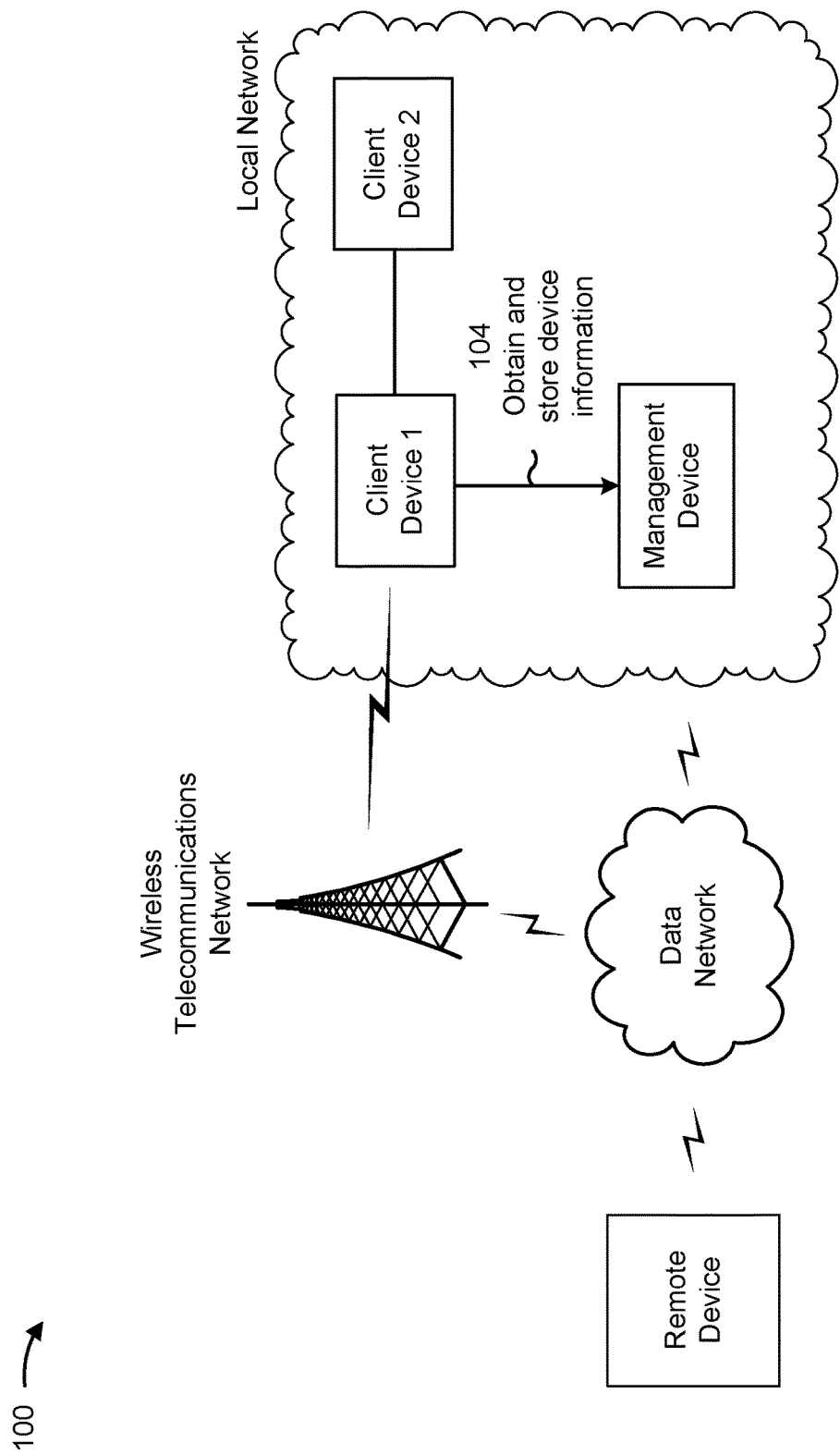

Turning now to FIG. 1B, and as shown by reference number 104, if the user of client device 1 provides the management device with permission for the management device to manage client device 1, the management device may obtain device information associated with client device 1. The device information may include information identifying a device identifier associated with client device 1 (e.g., a media access control (MAC) address, a serial number, etc.), information identifying an original equipment manufacturer (OEM) associated with the device, information identifying one or more communications interfaces on client device 1 (e.g., Ethernet, Wi-Fi, Bluetooth, NFC, Zigbee, Z-wave, etc.), information associated with one or more in-bound and/or out-bound connections of client device 1 (e.g., an Internet protocol (IP) address associated with client device 1, IP address associated another device to which client device 1 is connected, Wi-Fi signal strength, bandwidth usage, etc.), information associated with maintenance performed on client device 1 (e.g., software version history, software update history, etc.), and/or the like.

In some implementations, the management device may store the device information associated with client device 1 in a network data structure. The network data structure may be one or more data structures included in the local network. For example, the network data structure may be included in the management device, included in another location in the local network (e.g., a file server, a network-attached storage device, etc.), and/or the like.

Figure 1C:
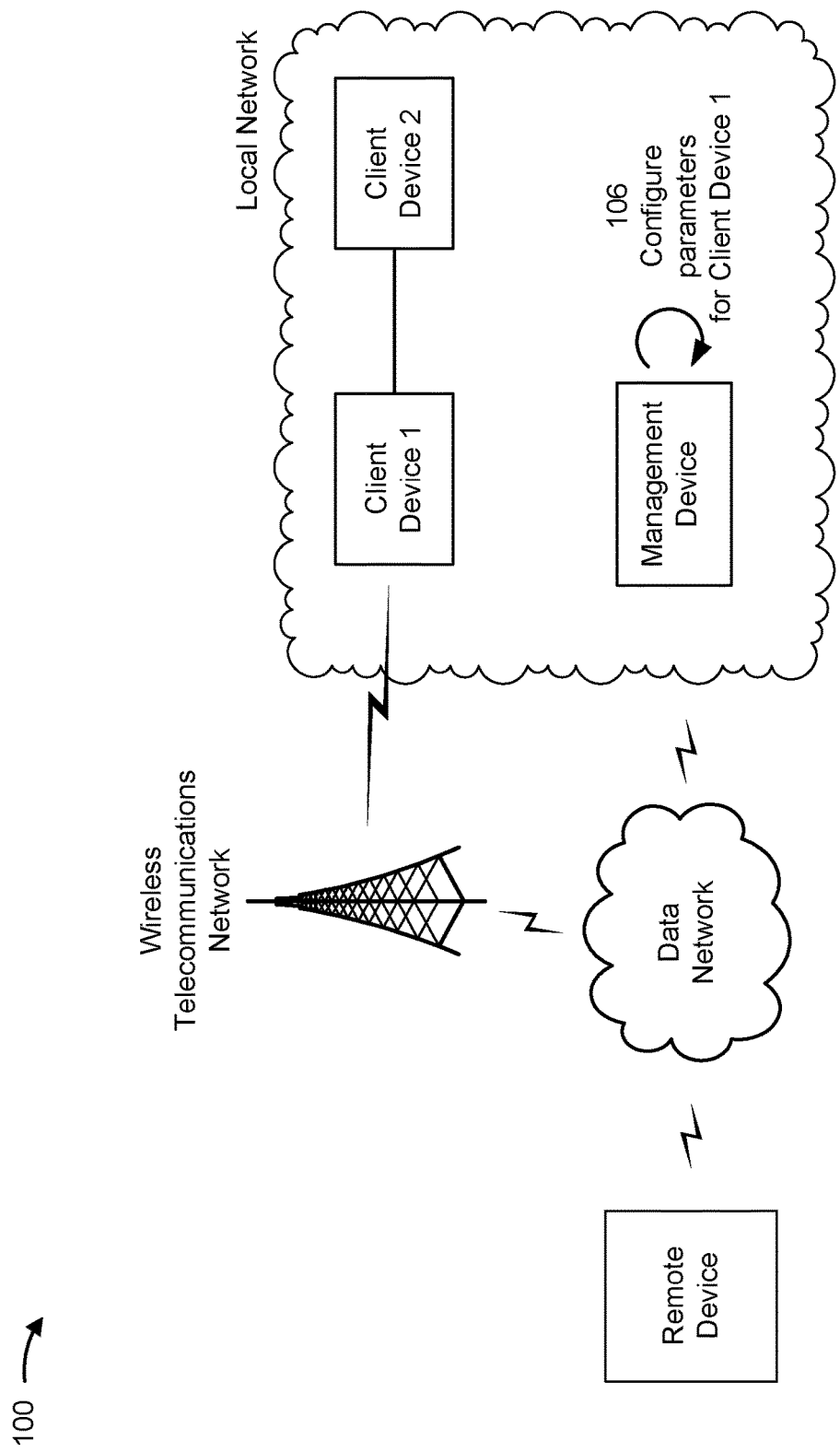

Turning now to FIG. 1C, and as shown by reference number 106, the management device may configure one or more parameters for managing client device 1. For example, the one or more parameters may include one or more remote connection parameters, one or more local connection parameters, one or more wireless telecommunications connection parameters, one or more monitoring parameters, one or more alarm parameters, and/or the like.

In some implementations, the management device may configure the one or more parameters based on input received from a user. For example, the user may provide the input to the management device through a graphical user interface (GUI). In some implementations, the GUI may be provided on the management device, on one or more of the client devices in the local network, or on another device. In some implementations, the user may select a client device in the local network as an administrator device, and the GUI may be provided on the administrator device. In some implementations, the management device may use authentication (e.g., a username and password, a passcode, two-factor authentication, and/or the like) to secure the GUI so that only authorized users are permitted to configure the one or more parameters for managing client device 1 and/or other client devices in the local network.

Additionally, or alternatively, the management device may configure the one more parameters automatically based on one or more management policies specified by the user. For example, the user may specify a management policy that specifies all client devices connected to the local network are to receive software updates at a specified time, and the management device may automatically configure a parameter for client device 1 based on the management policy.

In some implementations, the management device may configure the one or more remote connection parameters to manage a connection between client device 1 and the remote device. For example, the one or more remote connection parameters may include an in-bound connection parameter and/or an out-bound connection parameter.

In the case of an in-bound connection parameter, the management device may configure an in-bound connection parameter that specifies client device 1 is permitted to accept an in-bound connection to client device 1 from the remote devices via the data network. For example, the management device may configure an in-bound connection parameter that specifies that client device 1 is permitted to accept a connection request from an application server, that specifies that client device 1 is permitted to accept a connection request from a remote device at particular times or time periods during a day (e.g., between 12:00 pm and 6:00 pm), and/or the like. In some implementations, the management device may configure an in-bound connection parameter that specifies one or more types of data that client device 1 is permitted to receive and/or not permitted to receive from the remote device. For example, the management device may configure an in-bound connection parameter that specifies that client device 1 is not permitted to receive software application updates from the remote device. In some implementations, the management device may configure an in-bound connection parameter that specifies one or more local data structures on client device 1 that the remote device is permitted and/or not permitted to access. For example, the management device may configure an in-bound connection parameter that specifies that the remote device is not permitted to access a photo database on client device 1. In some implementations, the management device may configure an in-bound connection parameter that specifies an amount of data client device 1 is permitted to receive on an in-bound connection. For example, the management device may configure an in-bound connection parameter that specifies client device 1 is permitted to receive 1 Gb of data per day on an in-bound connection from the remote device.

In the case of an out-bound connection parameter, the management device may configure an out-bound connection parameter that specifies whether client device 1 is permitted to establish an out-bound connection with the remote device. For example, the management device may configure an out-bound connection parameter that specifies client device 1 is not permitted to establish an out-bound connection with the remote device, that specifies client device 1 is permitted to establish an out-bound connection with the remote device at particular times or time periods during a day (e.g., between the hours of 4:00 pm and 8:00 pm), and/or the like. In some implementations, the management device may configure an out-bound connection parameter that specifies one or more types of data that client device 1 is permitted and/or not permitted to transmit to the remote device. For example, client device 1 may be an IP camera, and the management device may configure an out-bound connection parameter that specifies that client device 1 is not permitted to transmit video stream data and/or recorded video data to the remote device. In some implementations, the management device may configure an out-bound connection parameter that specifies an amount of data client device 1 is permitted to transmit on an out-bound connection. For example, the management device may configure an out-bound connection parameter that specifies client device 1 is permitted to transmit 20 Mb of data per hour on an out-bound connection to the remote device.

In some implementations, the management device may configure the one or more local connection parameters to manage a connection between client device 1 and another client device (e.g., client device 2) in the local network. For example, the management device may configure a local connection parameter that specifies whether client device 1 is permitted to connect to client device 2, and if so, one or more types of connections that client device 1 may use to connect to client device 2. For example, the management device may configure a local connection parameter that specifies that client device 1 is permitted to connect to client device 2 though the local network using the Ethernet protocol, and is not permitted to connect to client device 2 in a P2P connection using Bluetooth. In some implementations, the management device may configure a local connection parameter that specifies one or more types of data and/or applications that client device 2 is permitted to access on client device 1. For example, client device 1 may be a digital media player device and client device 2 may be a smart phone, and the management device may configure a local connection parameter that specifies that client device 2 is permitted to access a music streaming application on client device 1, and is not permitted to download and/or install additional applications on client device 1.

In some implementations, the management device may configure the one or more wireless telecommunications connection parameters to manage a connection between client device 1 and the wireless telecommunications network. For example, the management device may configure a wireless telecommunications connection parameter that specifies whether another client device (e.g., client device 2) in the local network is permitted to use the wireless telecommunications connection of client device 1 to access the data network, to communicate with the remote device, and/or the like. As another example, the management device may configure a wireless telecommunications connection parameter that specifies one or more types of data that client device 1 is permitted to provide to the data network and/or the remote client device via the wireless telecommunications connection. For example, the management device may configure a wireless telecommunications connection parameter that specifies that client device 1 is not permitted to use the wireless telecommunications connection to provide the remote device with Internet usage data for other client devices in the local network. As another example, the management device may configure a wireless telecommunications connection parameter that specifies one or more types of data that the remote device and/or the data network is permitted to access on client device 1 via the wireless telecommunications connection. For example, the management device may configure a wireless telecommunications connection parameter that specifies that the remote device is not permitted to access location data on client device 1 via the wireless telecommunications connection.

In some implementations, the management device may configure the one or more monitoring parameters to monitor client device 1, collect data associated with client device 1, and/or store collected data associated with client device 1. In some implementations, the management device may configure the one or more monitoring parameters by configuring a monitoring parameter that specifies one or more types of data associated with client device 1 that are to be stored and/or not stored in the network data structure in the local network. The one or more types of data associated with client device 1 may include performance data (e.g., processor usage data, bandwidth usage data, energy usage data, local data structure usage data, and/or the like), behavior data (e.g., the client devices and/or the remote device client that client device 1 usually connects to, states of client device 1 (e.g., asleep, active, inactive, etc.) and times associated with the states, the types of messages client device 1 usually exchanges with other client devices and/or the remote device, and/or the like), data generated by client device 1 (e.g., picture data, video data, temperature measurement data, thermostat setting data, etc.), and/or the like. For example, client device 1 may be a smart thermostat, and the management device may configure a monitoring parameter that specifies that temperature measurement data is to be stored in the network data structure, and a monitoring parameter that specifies that temperature settings for the smart thermostat are not to be stored in the network data structure.

In some implementations, the management device may configure the one or more monitoring parameters by configuring a monitoring parameter that specifies a frequency at which data associated with client device 1 is to be collected and stored. For example, client device 1 may be a smart carbon monoxide detector, and the management device may configure a monitoring parameter that specifies that carbon monoxide measurements are to be collected and stored once an hour.

In some implementations, the management device may configure the one or more monitoring parameters by configuring a monitoring parameter that specifies one or more types of network data structures where the data associated with client device 1 is to be stored. For example, the management device may configure a monitoring parameter that specifies that the data associated with client device 1 is to be stored in a quick-access network data structure (e.g., a flash memory device, a hard drive device, and/or the like), a long-term network data structure (e.g., a backup storage device, a database, and/or the like), or another type of network data structure.

In some implementations, the management device may configure the one or more monitoring parameters by configuring a monitoring parameter that specifies a lifecycle of data associated with client device 1 that is collected. For example, the management device may configure a monitoring parameter that specifies that data associated with client device 1 that is collected is to be stored in a short-term data network structure for one week and then transferred to a long-term network data structure and stored for one year.

In some implementations, the management device may configure the one or more monitoring parameters by configuring a monitoring parameter that specifies one or more permissions and/or privileges for other client devices in the local network to access the data associated with the client device stored in the local network. For example, client device 1 may be a home security system and client device 2 may be a home management system, and the management device may configure a monitoring parameter that specifies that client device 2 is not permitted to access garage door data (e.g., dates and times the garage door was opened and/or closed) stored in the local network.

In some implementations, the management device may configure one or more alarm parameters to monitor events associated with client device 1. An alarm parameter may be associated with an alarm, which may be an indication that an event associated with client device 1 has occurred in the local network and/or in client device 1. In some implementations, the management device may configure the one or more alarm parameters for various types of events associated with client device 1. For example, the management device may configure the one or more alarm parameters based on the one or more remote connection parameters, the one or more local connection parameters, the one or more wireless communications connection parameters, the one or more monitoring parameters, as well as other parameters, properties, and/or data associated with client device 1.

As an example of an alarm, client device 1 may be a smart thermostat, and an alarm parameter may specify that an alarm is to be generated if the temperature measured by the smart thermostat satisfies a threshold temperature (e.g., 80° F.). As another example of an alarm, client device 1 may be a smart garage door opener, and an alarm parameter may specify that an alarm is to be generated if an amount of time the garage door has been opened satisfies a threshold amount of time. As another example of an alarm, the one or more remote connection parameters may specify that the remote device is not permitted to accept an in-bound connection from the remote device, and an alarm parameter may specify that an alarm is to be generated based on the management device detecting the remote device attempting to establish the in-bound connection with client device 1. As another example of an alarm, client device 1 may be a gaming system, and an alarm parameter may specify that an alarm is to be generated based on the management device detecting the remote device attempting to access user profile information on the gaming system.

As another example of an alarm, the one or more monitoring parameters may specify that bandwidth usage data associated with client device 1 is to be stored in the network data structure and that client device 2 is not permitted to access the bandwidth usage data in the network data structure, and the management device may configure an alarm parameter that specifies that an alarm is to be generated based on the management device detecting that client device 2 attempted to access the bandwidth usage data. As another example of an alarm, the one or more monitoring parameters may specify that performance data associated with client device 1 is to be stored in the network data structure, and the management device may configure an alarm parameter that specifies that an alarm is to be generated based on the management device detecting that the performance data associated with client device 1 is not within an expected range for the performance data. As another example of an alarm, the one or more monitoring parameters may specify that behavior data associated with client device 1 is to be stored in the network data structure, and the management device may configure an alarm parameter that specifies that an alarm is to be generated based on the management device detecting that the behavior data associated with client device 1 is not associated with one or more expected behavior types for client device 1.

In some implementations, the one or more alarm parameters may specify a format for an alarm, such as one or more types of information included in the alarm, a layout of information included in the alarm, and/or the like. In some implementations, the one or more alarm parameters may specify a frequency at which an alarm is provided. For example, an alarm parameter may specify that an alarm is to be provided once an hour, once a day, and/or the like. In some implementations, the one or more alarm parameters may specify one or more recipients for an alarm. For example, an alarm parameter may specify that an alarm is to be provided to client device 1, to the administrator device, to the remote device, and/or the like.

Figure 1D:
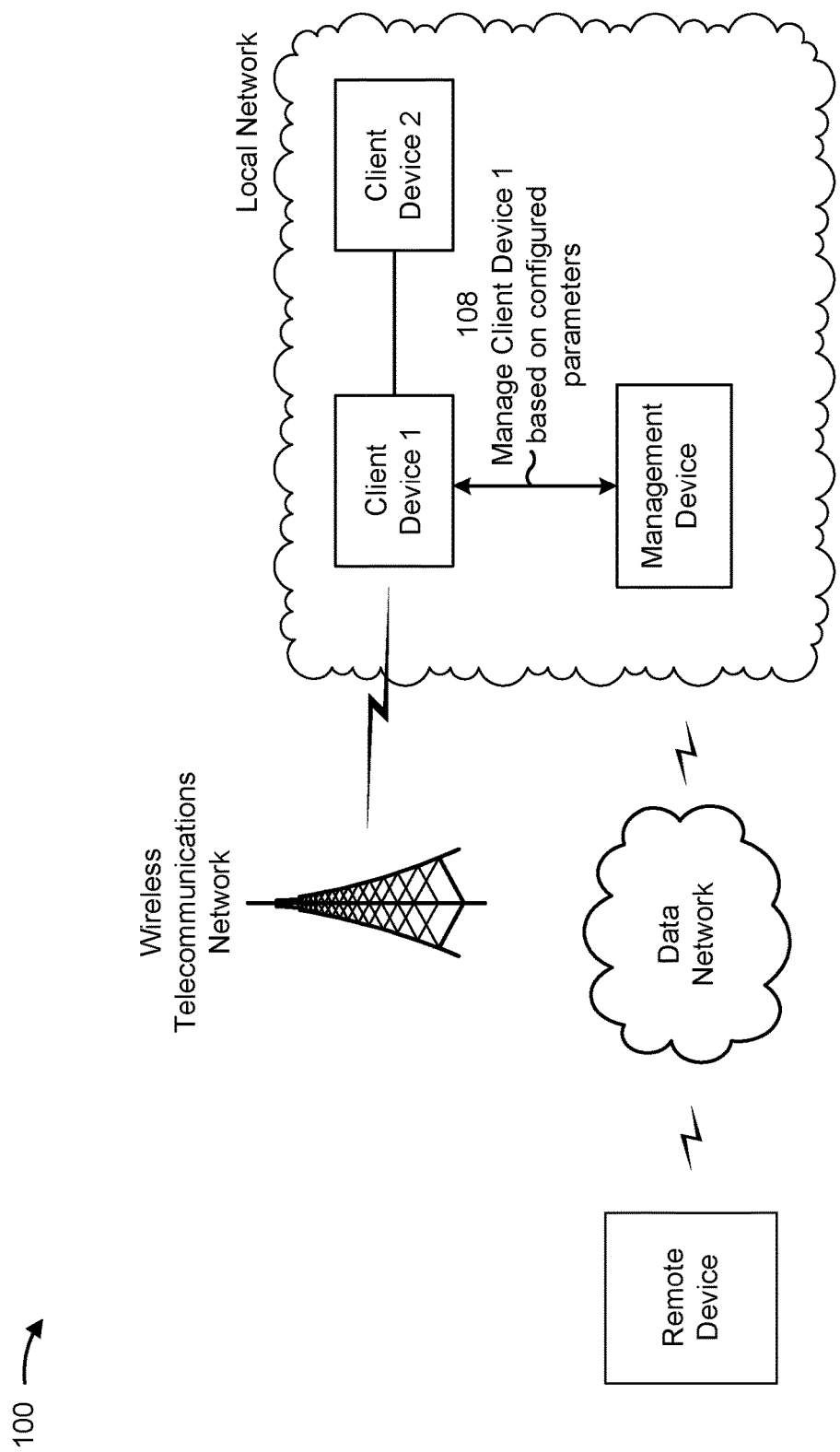

Turning now to FIG. 1D, and as shown by reference number 108, the management device may manage client device 1 based on the one or more parameters the management device configured for client device 1. For example, managing client device 1 based on the one or more parameters may include monitoring the remote connection between client device 1 and the remote device and enforcing the one or more remote connection parameters for the remote connection. As another example, managing client device 1 based on the one or more parameters may include monitoring the local connection between client device 1 and client device 2 and enforcing the one or more local connection parameters for the local connection. As another example, managing client device 1 based on the one or more parameters may include monitoring the wireless telecommunications connection between client device 1 and the wireless telecommunications network and enforcing the one or more wireless telecommunications connection parameters for the wireless telecommunications connection. As another example, managing client device 1 based on the one or more parameters may include collecting and storing performance data, behavior data, and/or data generated by client device 1 based on the one or more monitoring parameters for client device 1. As another example, managing client device 1 based on the one or more parameters may include generating and providing alarms based on the one or more alarm parameters configured for client device 1. As another example, managing client device 1 based on the one or more parameters may include controlling client device 1 and/or other client devices in the local network.

As an example, the management device may collect, based on the one or more monitoring parameters, data generated by client device 1, and may determine whether the data generated by client device 1 satisfies a threshold. For example, client device 1 may be a garage door opener, and the management device may collect data generated by the garage door opener, such as an amount of time a garage door associated with the garage door opener has been open, and may control the garage door opener to close the garage door based on determining that the amount of time the garage door has been open satisfies a threshold amount of time. In some implementations, the management device may control another client device (e.g., client device 2) in the local network based on the data generated by client device 1 satisfying the threshold. For example, client device 2 may be an IP camera, and the management device may cause the IP camera to record a video and/or take a picture of the area near the garage door associated with the garage door opener and transmit the video and/or picture to another device (e.g., a remote device, another client device in the local network, etc.) based on determining that the amount of time the garage door has been open satisfies the threshold amount of time.

As another example, the management device may collect, based on the one or more monitoring parameters, performance data associated with client device 1, and may determine whether the collected performance data is within an expected range for the collected performance data. The management device may determine whether the collected performance data is within the expected range by training a predictive machine learning model to historical performance data associated with client device 1 to generate the expected range, and may compare the collected performance data with the expected range to determine whether the collected performance data is in the expected range. If the collected performance data is not in the expected range, the management device may generate an alarm and provide the alarm (e.g., to client device 1, to the administrator device, and/or the like), may control client device 1 by causing client device 1 to reboot, and/or the like. In some implementations, instead of using a range, the management device may use a performance data threshold, and may determine whether the collected performance data satisfies the performance data threshold.

As another example, the management device may collect, based on the one or more monitoring parameters, behavior data associated with client device 1, and may determine whether the collected behavior data is associated with one or more expected behavior types for client device 1. The management device may determine whether the collected behavior data is associated with the one or more expected behavior types for client device 1 by training a clustering machine learning model (e.g., k-means clustering, hierarchical clustering, density-based clustering, distribution-based clustering, and/or the like) to historical behavior data associated with client device 1 to specify one or more behavior clusters associated with the expected behavior types for client device 1, and may compare the collected behavior data with the one or more behavior clusters to determine whether the collected behavior data is associated with the one or more behavior clusters. If the collected behavior data is not associated with any of the one or more behavior clusters, the management device may generate an alarm and provide the alarm (e.g., client device 1, to the administrator device, and/or the like).

As indicated above, FIGS. 1A-1D is provided merely as an example. Other examples are possible and may differ from what was described with regard to FIGS. 1A-1D.

Figure 2:
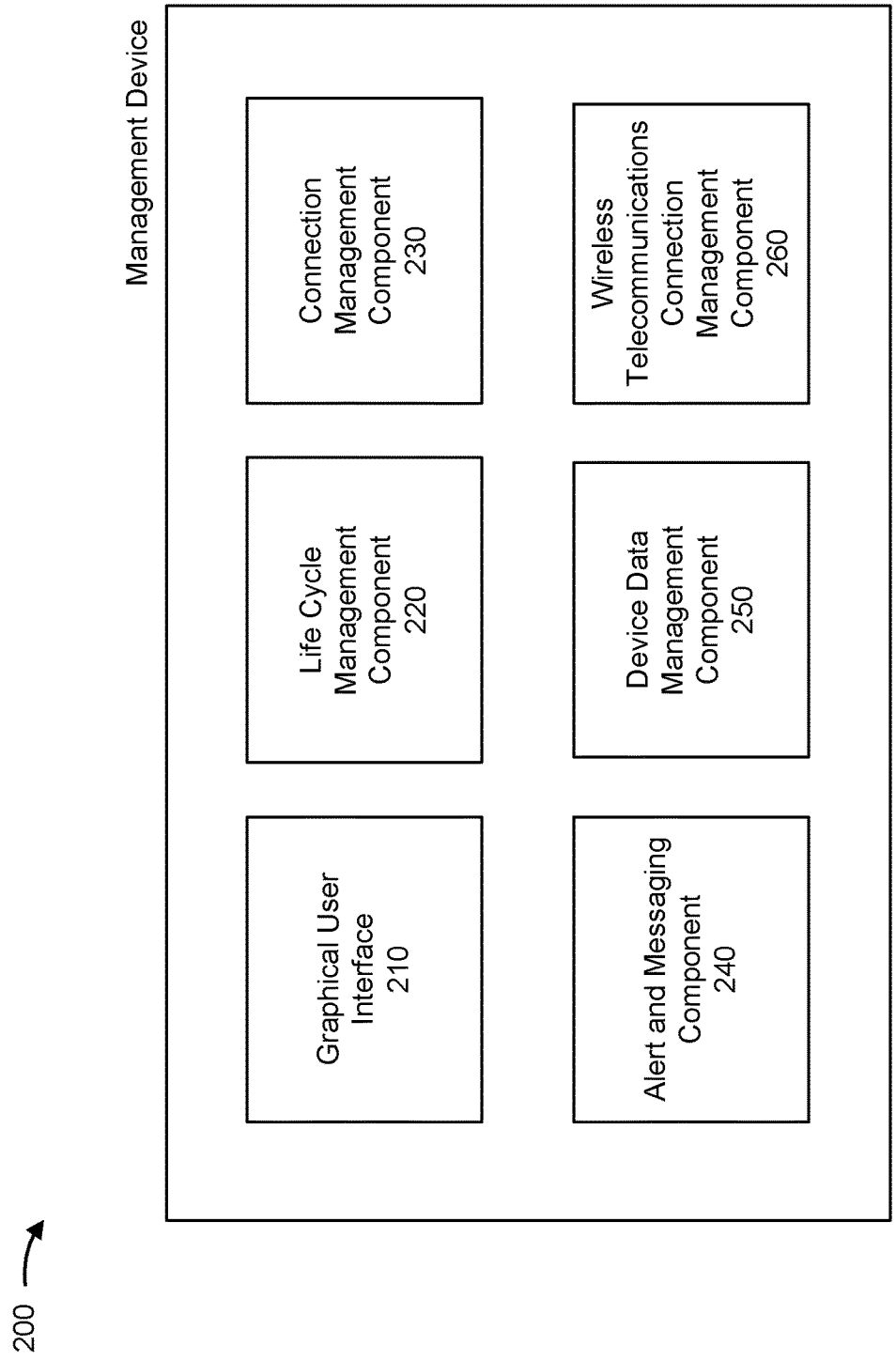
FIG. 2 is a diagram of an example management device in which functions and/or components described herein may be implemented.

FIG. 2 is a diagram of an example management device 200 in which functions and/or components described herein may be implemented. As shown in FIG. 2, management device 200 may include various components, such as a GUI 210, a life cycle management component 220, a connection management component 230, an alert and messaging component 240, a device data management component 250, a wireless telecommunications connection management component 260, and/or the like. Management device 200 may be included in a local network and may manage one or more client devices in the local network GUI 210 may provide an interface for a user to manage the management device, view alarms, view data associated with the client devices in the local network, and/or the like. For example, GUI 210 may provide an interface for the user to configure and/or update parameters associated with any of the components 220-260. In some implementations, the user may use GUI 210 to set up an administrator account, select a client device among the client devices in the local network as an administrator device, advertise the management device in the local network as a service, and/or the like.

Life cycle management component 220 may manage the hardware and/or software life cycle of a client device in the local network. In some implementations, management of the hardware life cycle may include connecting the client device to the local network, registering the client device for sharing data and status reporting in the local network, managing and/or controlling various states of the client device (e.g., an active state, a standby state, a sleep state, a wakeup state, an offline state, and/or the like), managing various resources of the client device (e.g., network address of the client device, battery life of the client device, memory utilization of the client device, processor utilization of the client device, and/or the like), replacing the client device (e.g., providing a notification to a user to replace the device in the local network), retiring the client device (e.g., providing a notification to a user to remove the device from the local network), and/or the like. As a particular example, life cycle management component 220 may connect and register the client device in the local network. As another particular example, life cycle management component 220 may identify the client device, mark the client device as retired, verify that the client device is to be removed from the local network, manage data associated with the client device stored in the local network (e.g., delete the data, transmit the data to another location, etc.), verify that the client device has been removed from the local network, and/or the like.

In some implementations, management of the software life cycle may include activating software preloaded on the client device, installing additional software on the client device, updating installed software installed on the client device, removing software from the client device, and/or the like. For example, life cycle management component 220 may identify the client device, identify a software application on the client device, identify a software update for the software application, install the software update on the client device, verify that the software update has been installed on the client device, and/or the like.

Connection management component 230 may manage in-bound and/or out-bound connections between a client device and a remote device, as well as connections between the client device and another client device in the local network. In some implementations, management of an in-bound connection of the client device may include configuring one or more in-bound connection parameters, as described above in connection with FIGS. 1A-1D. In some implementations, management of an out-bound connection of the client device may include configuring one or more out-bound connection parameters, as described above in connection with FIGS. 1A-1D. In some implementations, management of a connection between the client device and another client device in the local network may include configuring one or more local connection parameters, as described above in connection with FIGS. 1A-1D.

Alert and messaging component 240 may manage and monitor the client device, and/or provide messages and alarms to various client devices in the local network, as well as remote devices external to the local network. In some implementations, managing and providing messages may include specifying the types of messages that may be sent among client devices in the network (e.g., specifying the protocols that may be used, defining the message formats that may be used, etc.), specifying the types of messages that may be sent between client devices and remote devices, filtering information from messages between client devices and/or between client devices and remote devices, providing messages to client devices in the network, providing messages to remote devices, and/or the like. In some implementations, managing and providing alarms may include specifying one or more alarm parameters, generating alarms, and/or providing alarms, as described above in connection with FIGS. 1A-1D.

Device data management component 250 may manage data generated by the client device and stored in the local network by configuring one or more monitoring parameters, as described above in connection with FIGS. 1A-1D.

Wireless telecommunications connection management component 260 may manage a wireless telecommunications connection between the client device and a wireless telecommunications network external to the local network. The client device may be equipped with a wireless telecommunications interface, and may connect to the wireless telecommunications network using the wireless telecommunications interface. The client device may also connect to management device 200 using a connection in the local network. In this way, wireless telecommunications connection management component 260 of management device 200 may manage the wireless telecommunications connection between the client device and the wireless telecommunications network using the connection in the local network between the client device and management device 200. For example, wireless telecommunications connection management component 260 may configure one or more wireless telecommunications connection parameters for the wireless telecommunications connection between the client device and the wireless telecommunications network, as described above in connection with FIGS. 1A-1D, and may enforce the one or more wireless telecommunications connection parameters using the local connection between the client device and management device 200.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components of management device 200 may perform one or more functions described as being performed by another set of components of management device 200.

Figure 3:
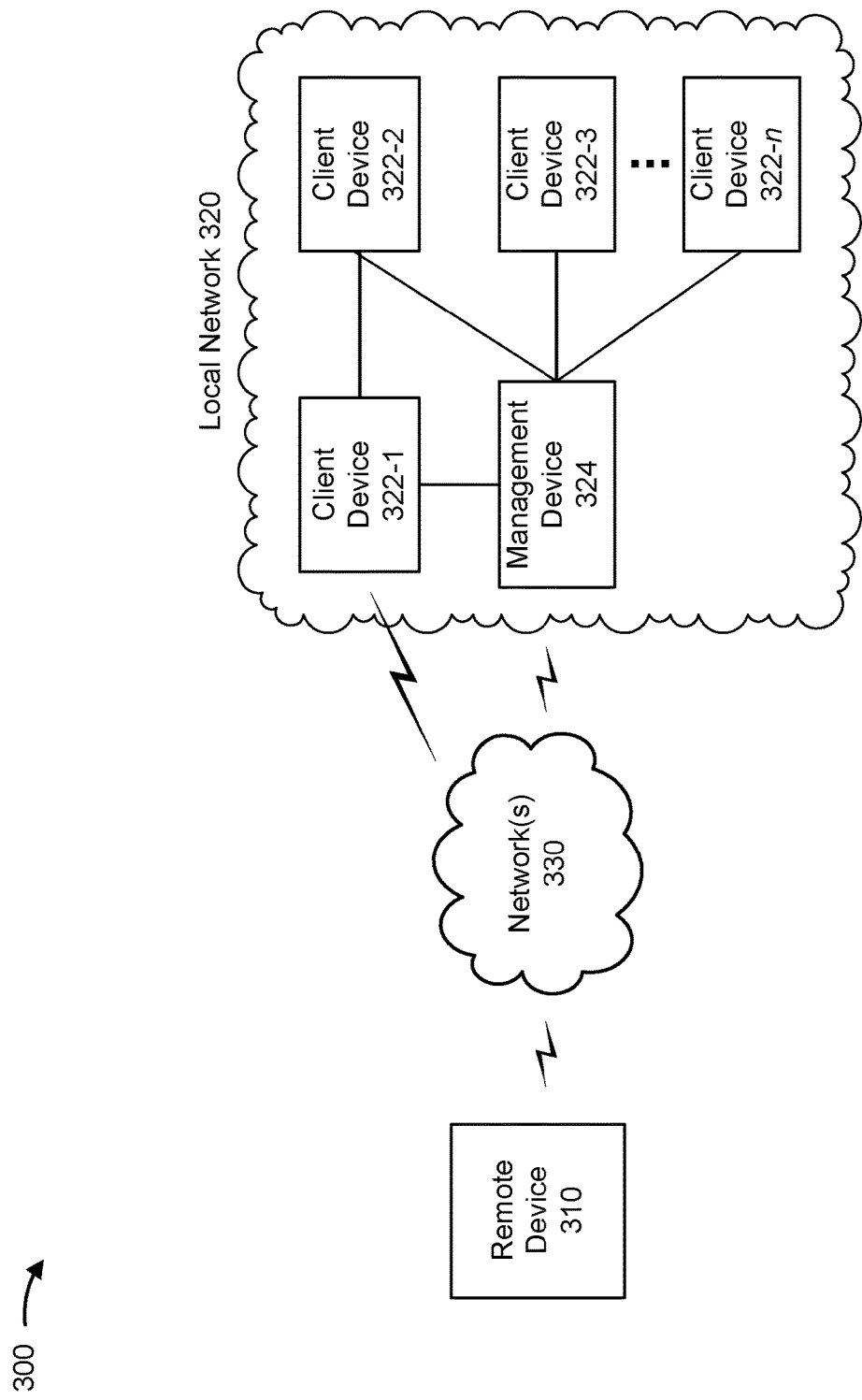
FIG. 3 is a diagram of an example environment in which devices, systems, and/or methods, described herein, may be implemented.

FIG. 3 is a diagram of an example environment 300 in which systems and/or methods, described herein, may be implemented. As shown in FIG. 3, environment 300 may include a remote device 310, a local network 320, a plurality of client devices 322-1 through 322-n (individually referred to as "client device 322" and collectively referred to as ("client devices 322"), a management device 324, and one or more networks 330. Devices of environment 300 may interconnect via wired connections, wireless connections, or a combination of wired and wireless connections.

Remote device 310 includes one or more devices capable of communicating with client devices 322 and/or management device 324 (e.g., via network(s) 330). In some implementations, remote device 310 may be a client device, such as a mobile phone (e.g., a smart phone, a radiotelephone, etc.), a laptop computer, a tablet computer, a handheld computer, a gaming device, a wearable communications device (e.g., a smart wristwatch, a pair of smart eyeglasses, etc.), a desktop computer, an IoT device, and/or the like. In some implementations, remote device 310 may be a server device, such as an application server, a data center, a virtual machine (VM) server, a cloud server and/or the like.

Local network 320 is a wired and/or wireless LAN that includes client devices 322 and management device 324. In some implementations, local network 320 may be a home network, a campus network, an office network, and/or the like. In some implementations, local network 320 may be communicatively connected with network(s) 330 via one or more networking devices, such as a firewall, a router, a switch, a base station (e.g., a macrocell, a femtocell, a small cell, and/or the like), a gateway, and/or the like.

Client devices 322 include one or more devices capable of communicating with remote device 310 (e.g., via network(s) 330) and/or management device 324. In some implementations, client devices 322 may be client devices similar to those described above in reference to remote device 310. In some implementations, client devices 322 and/or management device 324 may communicate in local network 320 using various communications protocols and/or communications interfaces, such as Ethernet, Bluetooth, NFC, Zigbee, Z-wave, Wi-Fi (IEEE 802.11), and/or the like. In some implementations, client devices 322 may communicate directly (i.e., via P2P communications), through management device 324, through a network device, and/or the like.

In some implementations, client devices 322 may communicate with remote device 310 through management device 324. In some implementations, client devices 322 may communicate with remote device 310 through a communications path that does not include management device 324 (e.g., a wireless telecommunications path and/or the like).

Management device 324 includes one or more devices capable of communicating with remote device 310 (e.g., via network(s) 330) and/or client devices 322. In some implementations, management device 324 may be a server device (e.g., a desktop server, a VM server, and/or the like), a network device (e.g., a router, a switch, a gateway, a firewall, and/or the like), a personal computing device (e.g., a laptop computer, a mobile phone, and/or the like), and/or the like. In some implementations, management device 324 may manage client devices 322 in local network 320. For example, management device 324 may manage client devices 322, as described above in connection with FIGS. 1A-1D. As another example, management device 324 may implement the functions described above in connection with management device 200 illustrated in FIG. 2.

Network(s) 330 includes one or more wired and/or wireless networks. For example, network(s) 330 may include a wireless telecommunications network (e.g., a code division multiple access (CDMA) network, a 3G network, a 4G/LTE network, a 5G/NR network, another type of next generation network, etc.), a public land mobile network (PLMN), a LAN, a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
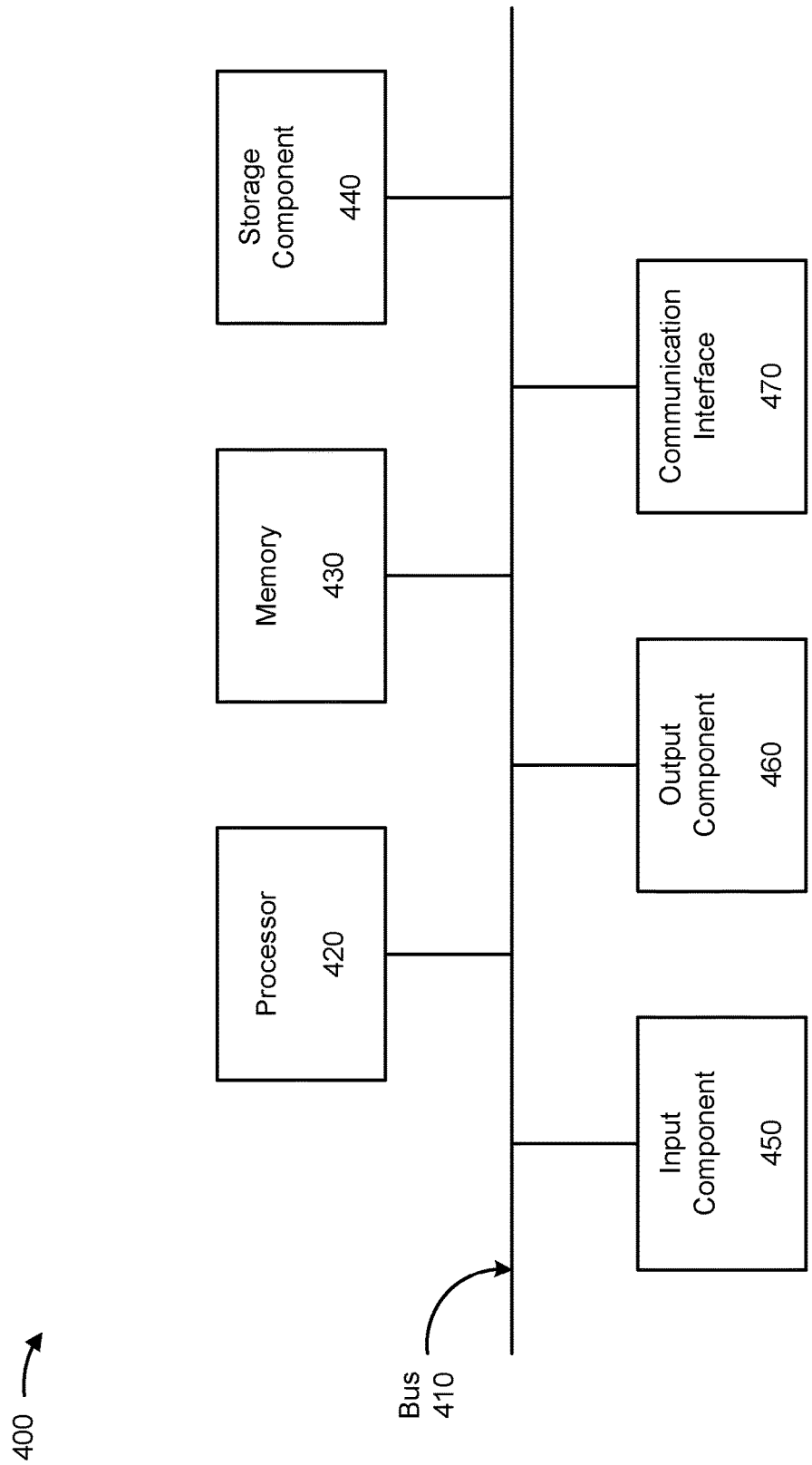
FIG. 4 is a diagram of example components of one or more devices of FIG. 2 and/or FIG. 3.

FIG. 4 is a diagram of example components of a device 400. Device 400 may correspond to remote device 310, client devices 322 and/or management device 324. In some implementations, remote device 310, client devices 322 and/or management device 324 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a wireless telecommunications network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for managing devices in a local network. In some implementations, one or more process blocks of FIG. 5 may be performed by a device (e.g., management device 324). In some implementations, one or more process blocks of FIG. 5 may be performed by another device or a group of devices separate from or including management device 324, such as remote device 310, one or more client devices 322, and/or the like.

As shown in FIG. 5, process 500 may include identifying a client device, of a plurality of client devices, in a local network (block 510). For example, the device (e.g., management device 324, using processor 420, memory 430, storage component 440, input component 450, communication interface 470, and/or the like) may identify a client device, of a plurality of client devices, in a local network, as described above in connection with FIGS. 1A-1D and/or 2.

As further shown in FIG. 5, process 500 may include configuring one or more remote connection parameters for a connection between the client device and a remote device (block 520). For example, the device (e.g., management device 324, using processor 420, memory 430, storage component 440, input component 450, and/or the like) may configure one or more remote connection parameters for a connection between the client device and a remote device, as described above in connection with FIGS. 1A-1D and/or 2. In some implementations, the remote device may be external to the local network.

As further shown in FIG. 5, process 500 may include configuring one or more local connection parameters for a connection between the client device and another client device, of the plurality of client devices, in the local network (block 530). For example, the device (e.g., management device 324, using processor 420, memory 430, storage component 440, input component 450, and/or the like) may configure one or more local connection parameters for a connection between the client device and another client device, of the plurality of client devices, in the local network, as described above in connection with FIGS. 1A-1D and/or 2.

As further shown in FIG. 5, process 500 may include configuring one or more monitoring parameters for monitoring the client device (block 540). For example, the device (e.g., management device 324, using processor 420, memory 430, storage component 440, input component 450, and/or the like) may configure one or more monitoring parameters for monitoring the client device, as described above in connection with FIGS. 1A-1D and/or 2.

As further shown in FIG. 5, process 500 may include configuring one or more alarm parameters for the client device (block 550). For example, the device (e.g., management device 324, using processor 420, memory 430, storage component 440, input component 450, and/or the like) may configure one or more alarm parameters for the client device, as described above in connection with FIGS. 1A-1D and/or 2.

As shown in FIG. 5, process 500 may include managing the client device based on at least one of the one or more remote connection parameters, the one or more local connection parameters, the one or more monitoring parameters, or the one or more alarm parameters (block 560). For example, the device (e.g., management device 324, using processor 420, memory 430, storage component 440, input component 450, output component 460, communication interface 470, and/or the like) may manage the client device based on at least one of the one or more remote connection parameters, the one or more local connection parameters, the one or more monitoring parameters, or the one or more alarm parameters, as described above in connection with FIGS. 1A-1D and/or 2.

Process 500 may include additional implementations, such as any single implementation or any combination of implementations described below and/or described with regard to any other process described herein.

In some implementations, the one or more remote connection parameters for the connection between the client device and the remote device may include at least one of an in-bound connection parameter or an out-bound connection parameter. In some implementations, the in-bound connection parameter may specify whether the client device is permitted to accept an in-bound connection from the remote device. In some implementations, the out-bound connection parameter may specify one or more types of data the client device is permitted to provide to the remote device.

In some implementations, process 500 may include detecting that the client device attempted to connect to the local network, and identifying the client device based on detecting that the client device attempted to connect to the local network.

In some implementations, the one or more local connection parameters may specify at least one of whether the client device is permitted to connect to the other client device in the local network or one or more types of data the client device is permitted to share with the other client device in the local network.

In some implementations, the device is included in at least one of a standalone computing device in the local network, a router in the local network, a modem in the local network, or a switch in the local network.

In some implementations, the one or more monitoring parameters may specify at least one of a type of data, associated with the client device, that is to be collected and stored in a data structure in the local network, a time duration associated with the type of data, one or more permissions for the remote device to access the type of data when the type of data is stored in the data structure, or one or more permissions for the other device to access the type of data when the type of data is stored in the data structure. In some implementations, the time duration may specify an amount of time the type of data is to be stored in the data structure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for managing devices in a local network. In some implementations, one or more process blocks of FIG. 6 may be performed by a management device (e.g., management device 324). In some implementations, one or more process blocks of FIG. 6 may be performed by another device or a group of devices separate from or including management device 324, such as remote device 310, one or more client devices 322, and/or the like.

As shown in FIG. 6, process 600 may include identifying a client device of a plurality of client devices in a local network (block 610). For example, the management device (e.g., management device 324, using processor 420, memory 430, storage component 440, input component 450, communication interface 470, and/or the like) may identify a client device of a plurality of client devices in a local network, as described above in connection with FIGS. 1A-1D and/or 2.

As further shown in FIG. 6, process 600 may include configuring one or more remote connection parameters for a connection between the client device and a remote device (block 620). For example, the management device (e.g., management device 324, using processor 420, memory 430, storage component 440, input component 450, and/or the like) may configure one or more remote connection parameters for a connection between the client device and a remote device, as described above in connection with FIGS. 1A-1D and/or 2. In some implementations, the remote device may be external to the local network.

As further shown in FIG. 6, process 600 may include configuring one or more monitoring parameters for monitoring the client device (block 630). For example, the management device (e.g., management device 324, using processor 420, memory 430, storage component 440, input component 450, and/or the like) may configure one or more monitoring parameters for monitoring the client device, as described above in connection with FIGS. 1A-1D and/or 2.

As further shown in FIG. 6, process 600 may include configuring one or more alarm parameters for the client device (block 640). For example, the management device (e.g., management device 324, using processor 420, memory 430, storage component 440, input component 450, and/or the like) may configure one or more alarm parameters for the client device, as described above in connection with FIGS. 1A-1D and/or 2. In some implementations, the one or more alarm parameters may be associated with at least one of the one or more remote connection parameters or the one or more monitoring parameters.

As shown in FIG. 6, process 600 may include monitoring the client device based on the one or more monitoring parameters (block 650). For example, the management device (e.g., management device 324, using processor 420, memory 430, storage component 440, input component 450, communication interface 470, and/or the like) may monitor, by the management device, the client device based on the one or more monitoring parameters, as described above in connection with FIGS. 1A-1D and/or 2.

As shown in FIG. 6, process 600 may include generating an alarm based on monitoring the device and based on the one or more alarm parameters (block 660). For example, the management device (e.g., management device 324, using processor 420, memory 430, storage component 440, input component 450, and/or the like) may generate an alarm based on monitoring the device and based on the one or more alarm parameters, as described above in connection with FIGS. 1A-1D and/or 2.

As shown in FIG. 6, process 600 may include providing the alarm to another client device, of the plurality of client devices, in the local network (block 670). For example, the management device (e.g., management device 324, using processor 420, memory 430, storage component 440, output component 460, communication interface 470, and/or the like) may provide the alarm to another client device, of the plurality of client devices, in the local network, as described above in connection with FIGS. 1A-1D and/or 2.

Process 600 may include additional implementations, such as any single implementation or any combination of implementations described below and/or described with regard to any other process described herein.

In some implementations, the one or more remote connection parameters may specify that the remote device does not have permission to access one or more types of data on the client device. In some implementations, the one or more alarm parameters may specify that the management device is to generate the alarm based on detecting the remote device attempting to access the one or more types of data on the client device.

In some implementations, the one or more monitoring parameters may specify that the management device is to monitor one or more performance parameters associated with the client device. In some implementations, the one or more performance parameters associated with the client device may include at least one of processor usage, bandwidth usage, storage usage, or energy consumption.

In some implementations, monitoring the client device based on the one or more monitoring parameters may include collecting, based on the one or more monitoring parameters, performance data associated with the client device, training a predictive machine learning model on historical performance data associated with the client device, determining an expected range for the collected performance data based on training the predictive machine learning model on the historical performance data, and determining whether the collected performance data is within the expected range.

In some implementations, generating the alarm may include generating the alarm based on determining that the collected performance data is not within the expected range.

In some implementations, monitoring the client device based on the one or more monitoring parameters may include collecting, based on the one or more monitoring parameters, behavior data associated with the client device, applying a clustering machine learning model to historical behavior data associated with the client device, determining one or more behavior clusters for the client device based on applying the clustering machine learning model to the historical behavior data, and determining whether the collected behavior data is associated with the one or more behavior clusters. In some implementations, generating the alarm may include generating the alarm based on determining that the collected behavior data is associated with the one or more behavior clusters.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for managing devices in a local network. In some implementations, one or more process blocks of FIG. 7 may be performed by a management device (e.g., management device 324). In some implementations, one or more process blocks of FIG. 7 may be performed by another device or a group of devices separate from or including management device 324, such as remote device 310, one or more client devices 322, and/or the like.

As shown in FIG. 7, process 700 may include identifying a client device, of a plurality of client devices, in a local network (block 710). For example, the management device (e.g., management device 324, using processor 420, memory 430, storage component 440, input component 450, communication interface 470, and/or the like) may identify a client device, of a plurality of client devices, in a local network, as described above in connection with FIGS. 1A-1D and/or 2.

As further shown in FIG. 7, process 700 may include configuring one or more wireless telecommunications connection parameters for a connection between the client device and a wireless telecommunications network (block 720). For example, the management device (e.g., management device 324, using processor 420, memory 430, storage component 440, input component 450, and/or the like) may configure one or more wireless telecommunications connection parameters for a connection between the client device and a wireless telecommunications network, as described above in connection with FIGS. 1A-1D and/or 2.

As further shown in FIG. 7, process 700 may include configuring one or more local connection parameters for a connection between the client device and another client device, of the plurality of client devices, in the local network (block 730). For example, the management device (e.g., management device 324, using processor 420, memory 430, storage component 440, input component 450, and/or the like) may configure one or more local connection parameters for a connection between the client device and another client device, of the plurality of client devices, in the local network, as described above in connection with FIGS. 1A-1D and/or 2.

As further shown in FIG. 7, process 700 may include configuring one or more monitoring parameters for monitoring the client device (block 740). For example, the management device (e.g., management device 324, using processor 420, memory 430, storage component 440, input component 450, and/or the like) may configure one or more monitoring parameters for monitoring the client device, as described above in connection with FIGS. 1A-1D and/or 2.

As further shown in FIG. 7, process 700 may include configuring one or more alarm parameters for the client device (block 750). For example, the management device (e.g., management device 324, using processor 420, memory 430, storage component 440, input component 450, and/or the like) may configure one or more alarm parameters for the client device, as described above in connection with FIGS. 1A-1D and/or 2.

As shown in FIG. 7, process 700 may include managing the client device based on at least one of the one or more wireless telecommunications connection parameters, the one or more local connection parameters, the one or more monitoring parameters, or the one or more alarm parameters (block 760). For example, the management device (e.g., management device 324, using processor 420, memory 430, storage component 440, input component 450, output component 460, communication interface 470, and/or the like) may manage the client device based on at least one of the one or more wireless telecommunications connection parameters, the one or more local connection parameters, the one or more monitoring parameters, or the one or more alarm parameters, as described above in connection with FIGS. 1A-1D and/or 2.

Process 700 may include additional implementations, such as any single implementation or any combination of implementations described below and/or described with regard to any other process described herein.

In some implementations, the one or more wireless telecommunications connection parameters may specify whether the other client device is permitted to use the connection between the client device and the wireless telecommunications network. In some implementations, the one or more wireless telecommunications connection parameters may specify one or more types of data the client device is permitted to provide to the wireless telecommunications network. In some implementations, the one or more local connection parameters may specify one or more types of connections that are permitted to be used for the connection between the client device and the other client device. In some implementations, the one or more types of connections may include at least one of a Wi-Fi connection, a Zigbee connection, a Z-wave connection, a Bluetooth connection, or a wired Ethernet connection.

In some implementations, process 700 may include obtaining device information associated with the client device, storing the device information in a data structure, and configuring at least one of the one or more wireless telecommunications connection parameters or the one or more local connection parameters based on the stored device information. In some implementations, the stored device information may include at least one of a device identifier associated with the client device, one or more connection interfaces associated with the client device, hardware information associated with the client device, or software information associated with the client device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, and is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
identify a client device, of a plurality of client devices, in a local network;
provide a notification to the client device including a request for permission from a user of the client device to allow the device to manage the client device,
wherein the notification is provided based on detecting that the client device is attempting to connect to the local network, and
wherein permission is received from the client device to allow the device to manage the client device;
configure one or more wireless telecommunications parameters for a connection between the client device and a remote device,
wherein the remote device is external to the local network;
configure one or more local connection parameters for a connection between the client device and another client device, of the plurality of client devices, in the local network;
configure one or more monitoring parameters for monitoring the client device;
configure one or more alarm parameters for the client device;
manage the client device based on:
the one or more wireless telecommunications parameters,
wherein the one or more wireless telecommunications parameters specify whether the other client device is permitted to use the connection between the client device and the remote device,
the one or more local connection parameters,
the one or more monitoring parameters, and
the one or more alarm parameters; and
cause the client device to perform an action based on data generated by the client device satisfying a threshold.

2. The device of claim 1, wherein the one or more wireless telecommunications parameters for the connection between the client device and the remote device include at least one of an in-bound connection parameter or an out-bound connection parameter.

3. The device of claim 2, wherein the in-bound connection parameter specifies whether the client device is permitted to accept an in-bound connection from the remote device; and
wherein the out-bound connection parameter specifies one or more types of data the client device is permitted to provide to the remote device.

4. The device of claim 1, wherein the one or more processors, when identifying the client device in the local network, are to:
detect that the client device attempted to connect to the local network; and
identify the client device based on detecting that the client device attempted to connect to the local network.

5. The device of claim 1, wherein the one or more local connection parameters specifies at least one of:
whether the client device is permitted to connect to the other client device in the local network; or
one or more types of data the client device is permitted to share with the other client device in the local network.

6. The device of claim 1, wherein the device is included in at least one of:
a standalone computing device in the local network,
a router in the local network,
a modem in the local network, or
a switch in the local network.

7. The device of claim 1, wherein the one or more monitoring parameters specify at least one of:
a type of data, associated with the client device, that is to be collected and stored in a data structure in the local network,
a time duration associated with the type of data,
the time duration specifying an amount of time the type of data is to be stored in the data structure,
one or more permissions for the remote device to access the type of data when the type of data is stored in the data structure, or
one or more permissions for the other client device to access the type of data when the type of data is stored in the data structure.

8. A method, comprising:
identifying, by a management device in a local network, a client device of a plurality of client devices in the local network;
providing, by the management device, a notification to the client device including a request for permission from a user of the client device to allow the management device to manage the client device,
wherein the notification is provided based on detecting that the client device is attempting to connect to the local network, and
wherein permission is received from the client device to allow the management device to manage the client device;
configuring, by the management device, one or more wireless telecommunications parameters for a connection between the client device and a remote device,
wherein the remote device is external to the local network;
configuring, by the management device, one or more monitoring parameters for monitoring the client device;
configuring, by the management device, one or more alarm parameters for the client device,
wherein the one or more alarm parameters are associated with at least one of the one or more wireless telecommunications parameters or the one or more monitoring parameters;

monitoring, by the management device, the client device based on the one or more monitoring parameters;

generating, by the management device, an alarm based on monitoring the device and based on the one or more alarm parameters;

providing, by the management device, the alarm to another client device, of the plurality of client devices, in the local network, wherein the one or more wireless telecommunications parameters specify whether the other client device is permitted to use the connection between the client device and a wireless telecommunications network; and causing, by the management device, the client device to perform an action based on data generated by the client device satisfying a threshold.

9. The method of claim 8, wherein the one or more wireless telecommunications parameters specify that the remote device does not have permission to access one or more types of data on the client device; and wherein the one or more alarm parameters specify that the management device is to generate the alarm based on detecting the remote device attempting to access the one or more types of data on the client device.

10. The method of claim 8, wherein the one or more monitoring parameters specify that the management device is to monitor one or more performance parameters associated with the client device; and wherein the one or more performance parameters associated with the client device include at least one of:
processor usage,
bandwidth usage,
storage usage, or
energy consumption.

11. The method of claim 8, wherein monitoring the client device based on the one or more monitoring parameters comprises:

collecting, based on the one or more monitoring parameters, performance data associated with the client device;

training a predictive machine learning model on the performance data associated with the client device;

determining an expected range for the performance data based on training the predictive machine learning model on the performance data; and determining whether the performance data is within the expected range.

12. The method of claim 11, wherein generating the alarm comprises:

generating the alarm based on determining that the performance data is not within the expected range.

13. The method of claim 8, wherein monitoring the client device based on the one or more monitoring parameters comprises:

collecting, based on the one or more monitoring parameters, behavior data associated with the client device;

applying a clustering machine learning model to the behavior data associated with the client device;

determining one or more behavior clusters for the client device based on applying the clustering machine learning model to the behavior data; and determining whether the behavior data is associated with the one or more behavior clusters.

14. The method of claim 13, generating the alarm comprises:

generating the alarm based on determining that the behavior data is associated with the one or more behavior clusters.

15. A non-transitory computer-readable medium storing instructions, the instructions comprising:

one or more instructions that, when executed by one or more processors of a device, cause the one or more processors to:

identify a client device, of a plurality of client devices, in a local network;

provide a notification to the client device including a request for permission from a user of the client device to allow the device to manage the client device, wherein the notification is provided based on detecting that the client device is attempting to connect to the local network, and wherein permission is received from the client device to allow the device to manage the client device;

configure one or more wireless telecommunications connection parameters for a connection between the client device and a wireless telecommunications network;

configure one or more local connection parameters for a connection between the client device and another client device, of the plurality of client devices, in the local network, configure one or more monitoring parameters for monitoring the client device;

configure one or more alarm parameters for the client device;

manage the client device based on:
the one or more wireless telecommunications connection parameters,
wherein the one or more wireless telecommunications connection parameters specify whether the other client device is permitted to use the connection between the client device and the wireless telecommunications network,
the one or more local connection parameters,
the one or more monitoring parameters, and
the one or more alarm parameters; and cause the client device to perform an action based on data generated by the client device satisfying a threshold.

16. The non-transitory computer-readable medium of claim 15, wherein the one or more wireless telecommunications connection parameters specify one or more types of data the client device is permitted to provide to the wireless telecommunications network.

17. The non-transitory computer-readable medium of claim 15, wherein the one or more local connection parameters specify one or more types of connections that are permitted to be used for the connection between the client device and the other client device; and wherein the one or more types of connections include at least one of:
a WI-FI connection,
a ZIGBEE connection,
a Z-WAVE connection,
a BLUETOOTH connection, or
a wired ETHERNET connection.

18. The non-transitory computer-readable medium of claim 15, wherein the one or more instructions further cause the one or more processors to:

obtain device information associated with the client device;

store the device information in a data structure; and configure at least one of the one or more wireless telecommunications connection parameters or the one or more local connection parameters based on the device information.

19. The non-transitory computer-readable medium of claim 18, wherein the device information includes at least one of:

a device identifier associated with the client device, one or more connection interfaces associated with the client device, hardware information associated with the client device, or software information associated with the client device.

20. The non-transitory computer-readable medium of claim 15, wherein the one or more alarm parameters for the client device specify at least one of:

a format for an alarm, a frequency at which an alarm is provided, or one or more recipients for an alarm.

* * * * *